(12) United States Patent
Ishikawa et al.

(10) Patent No.: US 9,147,893 B2
(45) Date of Patent: Sep. 29, 2015

(54) FAILURE DIAGNOSTIC DEVICE FOR DISCHARGE VALVE

(75) Inventors: Norimasa Ishikawa, Toyota (JP); Naoki Kanie, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1055 days.

(21) Appl. No.: 11/579,126

(22) PCT Filed: May 24, 2005

(86) PCT No.: PCT/JP2005/009838
§ 371 (c)(1),
(2), (4) Date: Oct. 31, 2006

(87) PCT Pub. No.: WO2005/119823
PCT Pub. Date: Dec. 15, 2005

(65) Prior Publication Data
US 2007/0218327 A1 Sep. 20, 2007

(30) Foreign Application Priority Data

Jun. 2, 2004 (JP) .................. 2004-164288
Dec. 6, 2004 (JP) .................. 2004-352622

(51) Int. Cl.
*H01M 8/04* (2006.01)

(52) U.S. Cl.
CPC ...... *H01M 8/04089* (2013.01); *H01M 8/04231* (2013.01); *H01M 8/04402* (2013.01); *H01M 8/04686* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 5,059,494 A * | 10/1991 | Vartanian et al. ............ 429/415 |
| 6,044,826 A | 4/2000 | Bayerle et al. | |
| 2002/0127442 A1* | 9/2002 | Connor et al. ................. 429/12 |
| 2003/0109357 A1* | 6/2003 | Tabata .......................... 477/109 |
| 2004/0072052 A1 | 4/2004 | Yamamoto et al. | |
| 2004/0076860 A1 | 4/2004 | Aso et al. | |
| 2004/0106026 A1* | 6/2004 | Fujita et al. ..................... 429/24 |
| 2005/0110446 A1* | 5/2005 | Kagami et al. ................ 318/471 |
| 2008/0000215 A1* | 1/2008 | Duncan ........................... 60/204 |

FOREIGN PATENT DOCUMENTS

| | | |
|---|---|---|
| DE | 29 16 490 C2 | 5/1982 |
| DE | 196 34 975 C1 | 4/1998 |
| DE | 199 37 962 A1 | 2/2001 |
| DE | 42 16 044 C2 | 3/2001 |
| EP | 1 076 170 A2 | 2/2001 |

(Continued)

*Primary Examiner* — Patrick Ryan
*Assistant Examiner* — Angela Martin
(74) *Attorney, Agent, or Firm* — Oliff PLC

(57) ABSTRACT

A failure diagnostic device for accurately determining a failure of a discharge valve. A failure diagnostic device (50) serves to perform failure diagnostic of a discharge valve (62) installed in a discharge flow channel (32) of an anode discharge gas that is discharged from a fuel cell stack (20). The device comprises a detection unit (70) for detecting a status quantity of the anode discharge gas between a discharge port (27) for the anode discharge gas of the fuel cells tack (2) and the discharge valve (62) and a determination unit (51) for determining a failure of the discharge valve (62) based on the status quantity of the anode discharge gas detected by the detection unit (70) and a failure determination quantity corresponding to the operating state of the fuel cell stack (20).

14 Claims, 8 Drawing Sheets

(56) References Cited

FOREIGN PATENT DOCUMENTS

| | | | | | |
|---|---|---|---|---|---|
| EP | 1076170 | * | 2/2001 | ............ | F02M 25/07 |
| EP | 1 096 130 B1 | | 3/2003 | | |
| EP | 1096130 B1 | * | 3/2003 | ............ | F02M 25/07 |
| JP | A 8-329965 | | 12/1996 | | |
| JP | A 9-22711 | | 1/1997 | | |
| JP | A 2003-92125 | | 3/2002 | | |
| JP | A 2002-151126 | | 5/2002 | | |
| JP | A 2002-352824 | | 12/2002 | | |
| JP | A 2003-173810 | | 6/2003 | | |
| JP | A 2003-308866 | | 10/2003 | | |
| JP | A 2003-308868 | | 10/2003 | | |
| JP | A 2004-6217 | | 1/2004 | | |
| JP | 2004-127750 | * | 4/2004 | ............ | H01M 8/04 |
| JP | A 2004-127749 | | 4/2004 | | |
| JP | A 2004-127750 | | 4/2004 | | |
| JP | A 2004-146114 | | 5/2004 | | |

* cited by examiner

FAILURE DIAGNOSTIC DEVICE FOR DISCHARGE VALVE

BACKGROUND

The present invention relates to a failure diagnostic device for determining a failure of a discharge valve installed in a discharge flow channel of an anode discharge gas of a fuel cell system, and more particularly to improvement technology for increasing the accuracy of failure determination.

In a fuel cell system for generating electric power by supplying a fuel gas and an oxidizing gas to a fuel cell stack comprising a plurality of unit cells stacked in series, a configuration is known in which an unreacted hydrogen gas is reused for a cell reaction by refluxing the hydrogen gas that was discharged from an anode electrode to the anode electrode. A hydrogen discharge valve for discharging part of the hydrogen gas is provided in the circulation flow of the hydrogen gas, and when the concentration of components other than hydrogen in the hydrogen gas becomes high, the hydrogen discharge valve is periodically opened to maintain correctly the concentration of hydrogen supplied to the anode electrode. However, when the hydrogen discharge valve malfunctions and the opening-closing actuation of the valve does not function normally, a failure occurs during cell operation. For this reason, Japanese Patent Publication Laid-open No. 2003-92125 suggested a technology by which a hydrogen discharge instruction is conveyed to a hydrogen discharge valve and the failure of the hydrogen discharge valve is determined based on the target pressure of the fuel supply unit of the fuel cell stack and the actual hydrogen supply pressure. When the hydrogen discharge valve is open, the actual hydrogen supply pressure has to become lower than the target pressure. Therefore, if the difference therebetween is equal to or higher than a threshold, the operation is normal, and if the difference is less than the threshold, a closure failure is determined. Furthermore, when the hydrogen discharge valve is closed, the actual hydrogen supply pressure has to be equal to the target pressure. If the difference therebetween is less than a threshold value, the operation is normal, but if the difference is equal to or higher than the threshold, an opening failure can be determined.

SUMMARY

However, with the above-described technology, because a configuration is used in which a pressure sensor is disposed in a hydrogen supply channel of a fuel cell stack to detect the hydrogen supply pressure, when a configuration is employed such as that of a system equipped with a hydrogen circulation system, the hydrogen sensor will be affected by pulsations (pressure fluctuations) of the hydrogen circulation pump that transports the hydrogen gas. As a result, the hydrogen supply pressure necessary for failure diagnostics of the hydrogen discharge valve is difficult to detect accurately and there is a risk of diagnosing a failure erroneously.

Furthermore, when a pressure sensor is disposed upstream of the hydrogen discharge valve to detect the presence or absence of a failure of the hydrogen discharge valve, a sufficient pressure difference cannot be obtained and erroneous detection is sometimes made due to pressure loss in the pipes or pressure variations in the hydrogen circulation system caused by output fluctuations in the fuel cell.

Furthermore, according to prior art technology, the relationship between the opening-closing time of the hydrogen discharge valve and the power generation quantity of the fuel cell stack is saved in advance as map data and the hydrogen discharge valve is open-close controlled by referring to those map data. Therefore, when the flow rate characteristics of the hydrogen discharge valve change due to changes in the hydrogen discharge system with time or some system factors, a shift can occur between the actual hydrogen purge quantity and the map value (estimated hydrogen purge quantity). Where the actual hydrogen purge quantity becomes less than the map value, the concentration of impurities in the hydrogen supply system rises and power generation characteristics of the fuel cell stack degrade. On the other hand, when the actual hydrogen purge value exceeds the map value, the fuel consumption is deteriorated. When such an abnormality is detected, an abnormality region cannot be specified by detecting pressure variations in the hydrogen discharge passage upstream of the hydrogen discharge valve when the hydrogen discharge valve is opened and when it is closed.

Accordingly, it is an object of the present invention to resolve the above-described problems and to provide a failure diagnostic device capable of performing accurately failure determination of a discharge valve installed in a discharge flow channel of an anode discharge gas in a fuel cell system.

In order to solve the above-described problems the present invention provides a failure diagnostic device for diagnosing a failure of a discharge valve installed in a discharge flow channel of an anode discharge gas that is discharged from a fuel cell, the failure diagnostic device comprising a detection means for detecting a status quantity of the anode discharge gas between a discharge port of the anode discharge gas of the fuel cell and the discharge valve and a determination means for determining a failure of the discharge valve based on the status quantity of the anode discharge gas detected by the detection means. A correct failure diagnostic is possible because failure determination of the discharge valve is performed based on the status quantity of the anode discharge gas between the discharge port of the anode discharge gas and the discharge valve.

The failure diagnostic device in accordance with the present invention is a device for diagnosing a failure of a discharge valve installed in a discharge flow channel of an anode discharge gas that is discharged from a fuel cell, the failure diagnostic device comprising detection means for detecting a status quantity of the anode discharge gas between a discharge port for the anode discharge gas of the fuel cell and the discharge valve and determination means for determining a failure of the discharge valve based on the status quantity of the anode discharge gas detected by the detection means and a failure determination value corresponding to the operating state of the fuel cell. Failure determination is performed accurately, without being affected by the operation status of the fuel cell, by performing failure determination of the discharge valve based on a failure determination value corresponding to the operating state of the fuel cell.

A pressure of the anode discharge gas is preferred as the status quantity of the anode discharge gas.

The failure diagnostic device in accordance with the present invention further comprises throttle means for decreasing the flow channel section area of the discharge flow channel between the discharge port of the anode discharge gas and the discharge valve, and the detection means detects a status quantity of the anode discharge gas between the throttle means and the discharge valve. Disposing the throttle means in the discharge flow channel can greatly increase the decrease quantity of the anode discharge gas pressure when the discharge valve is opened. Therefore, accurate failure determination can be conducted that is not affected by the anode discharge gas pressure that changes depending on the operating state of the fuel cell.

Here, it is preferred that the determination means repeats multiple times the failure determination of the discharge valve when a failure of the discharge valve is detected. By such configuration, it is possible to avoid erroneous determination due to temporary malfunction or the like.

Furthermore, the determination means preferably determines a failure of the discharge valve based on pressure fluctuations occurring when the discharge valve is opened and closed. The valve failure can be determined by detecting pressure fluctuations occurring when the discharge valve is closed and opened.

The determination means preferably determines a failure of the discharge valve based on a pressure of the anode discharge gas detected by the detection means when the closed discharge valve is opened, a lowest pressure of the anode discharge gas detected by the detection means after the discharge valve has been opened and before it is closed, and a return pressure of the anode discharge gas detected by the detection means when the opened discharge valve is closed. Performing failure determination of the discharge valve based on the aforementioned plurality of pressure values makes it possible to realize a highly accurate failure determination.

Furthermore, the determination means preferably determines that a flow rate decrease cause is located downstream of the discharge valve or in the discharge valve itself when the decrease quantity of a pressure value of the anode discharge gas detected by the detection means when the closed discharge valve is opened is less than a predetermined threshold value, and determines that a flow rate decrease cause is located upstream of the discharge valve when the decrease quantity is equal to or higher than a predetermined threshold value. With such configuration, the location of the flow rate decrease cause in the discharge flow channel of the anode discharge gas can be specified.

DETAILED DESCRIPTION

The failure diagnostic device of the present embodiment detects the status quantity of a hydrogen gas (anode discharge gas) flowing in a hydrogen flow channel (hydrogen discharge channel or hydrogen circulation channel) between a hydrogen discharge port of a fuel cell and a hydrogen discharge valve when an open-close command is issued to the hydrogen discharge valve and determines a failure (improper actuation such as opening-closing failure, or gas leak caused by damage or the like) of the hydrogen discharge valve based on the detected status quantity of the hydrogen gas and failure determination value corresponding to the operating state of the fuel cell (for example, by comparing the relationship between the hydrogen gas status quantity and failure determination value). Here, the status quantity of hydrogen gas is a hydrogen pressure or a physical quantity (for example, flow rate or flow velocity of hydrogen gas) physically equivalent thereto. Furthermore, the status quantity of hydrogen gas is assumed to include a variation quantity or variation rate of a hydrogen pressure or a physical quantity that is physically equivalent thereto. In the below-described embodiments, a hydrogen pressure (absolute value) or a variation (differential pressure) thereof are taken as the gas status quantity by way of an example, but such selection is not limiting. Furthermore, the failure determination value as referred to herein is a status quantity of the hydrogen gas that is the object of failure determination and the failure determination value is preferably set so as to perform failure determination suitable for taking into consideration the fluctuation of the gas status quantity of the hydrogen gas that changes according to the operating state of the fuel cell.

Embodiment 1

Figure 1:
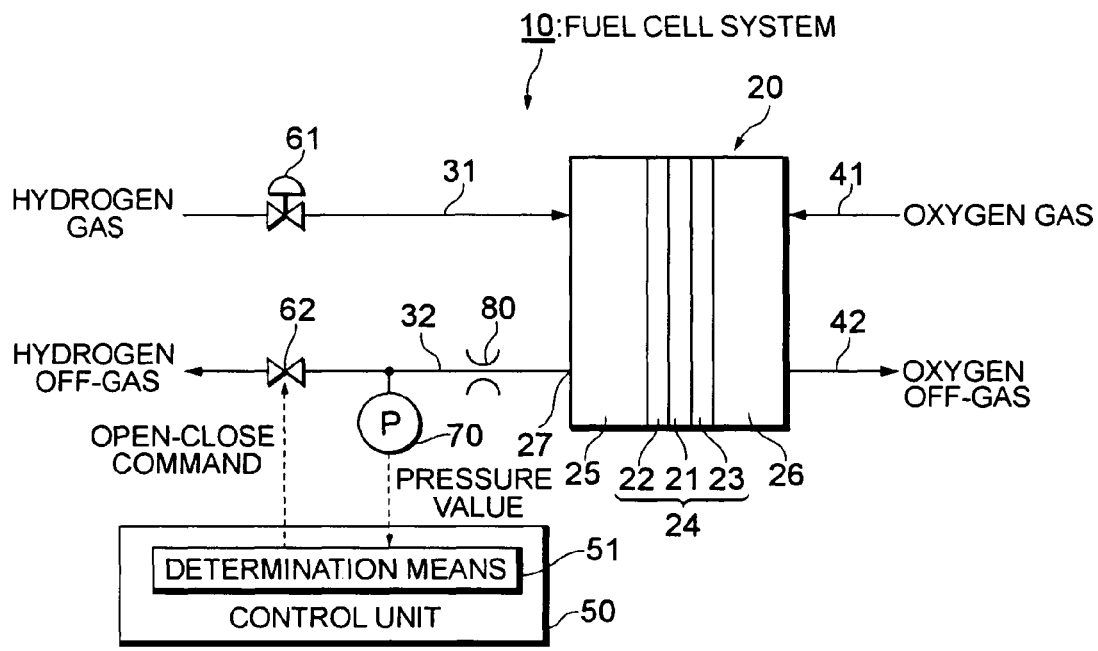
FIG. 1 is a structural diagram of main components of the fuel cell system of Embodiment 1.

FIG. 1 illustrates a schematic configuration of a fuel cell system 10 of the present embodiment. This system 10 is configured as a power generation system for stationary installation or for installation on a vehicle powered by a fuel cell. This system comprises a fuel cell stack 20 for generating electric power by receiving reaction gases (hydrogen gas, oxygen gas). The fuel cell stack 20 comprises a membrane electrode joint body 24 formed by, e.g., screen printing an anode electrode 22 and a cathode electrode 23 on both surfaces of a polymer electrolyte membrane 21 comprising a proton conductive ion-exchange membrane formed form a fluororesin or the like. Both surfaces of the membrane electrode joint body 24 are sandwiched by ribbed separators, and groove-shaped anode gas channel 25 and cathode channel 26 are formed between the separators and anode electrode 22 and cathode electrode 23. The pressure of hydrogen gas released from a hydrogen supply source (not shown in the figure) such as a high-pressure hydrogen tank or hydrogen storage alloy tank is reduced to the predetermined pressure with a regulator 61 and the hydrogen gas then flows through a hydrogen supply channel 31 and is supplied to the anode electrode 22. After the gas has participated in the cell reaction, it flows through the hydrogen discharge channel 32 and is discharged. A hydrogen discharge valve 62 for discharging the hydrogen off-gas to the outside of the system is installed in the hydrogen discharge channel 32. For example, an electromagnetic shut-off valve is preferred as the hydrogen discharge valve 62, and a linear valve or an on-off valve may be used. A pressure sensor 70 as a detection means for detecting the hydrogen pressure in the hydrogen discharge channel 32 is disposed between the hydrogen discharge port 27 of the fuel stack 20 and the hydrogen discharge valve 62. On the other hand, oxygen gas supplied from an oxygen supply channel 41 to the cathode electrode 23 participates in the cell reaction and is then discharged via an oxygen discharge channel 42. A control unit 50 is a system controller for conducting power generation control according to the required load. If necessary, the control unit issues an open-close command to the hydrogen discharge valve 62 to discharge the hydrogen off-gas periodically. The control unit 50 functions as a failure diagnostic device equipped with determination means 51 for determining a failure such as an open-close failure or damage of the hydrogen discharge valve 62 based on the hydrogen pressure detected by the pressure sensor 70.

Failure determination of the hydrogen discharge valve 62 will be summarized below. The tests conducted by the inventors confirmed that when the hydrogen discharge valve 62 is normally closed, the minimum value of hydrogen pressure (termed hereinbelow as "outlet hydrogen pressure") of the hydrogen discharge channel 32 between the hydrogen discharge port 27 and the hydrogen discharge valve 62 is equal to or higher than a supposed maximum pressure (estimated maximum pressure) during hydrogen purging (when the hydrogen discharge valve 62 is opened), and when the hydrogen discharge valve 62 is normally opened, the outlet hydrogen pressure is equal to or less than a supposed minimum pressure (estimated minimum pressure) during usual operation (when the hydrogen discharge valve 62 is closed). Here, the pressure value that is set correspondingly to the operating state of the system (an operation load of the fuel cells tack 20 or a flow rate characteristic of the regulator 61) or a constant pressure value that is not related to the operating state of the system may serve as the supposed maximum pressure during hydrogen purging and supposed minimum pressure during normal operation. Those pressure values (supposed maximum pressure during hydrogen purging and supposed minimum pressure during normal operation) can be used as failure determination values of the hydrogen discharge valve 62. More specifically, the presence or absence of an open-close failure or damage of the hydrogen discharge valve 62 can be determined by comparing the outlet hydrogen pressure (absolute value) at the time the hydrogen discharge valve 62 is closed or the outlet hydrogen pressure (absolute pressure) at the time the hydrogen discharge valve 62 is open with a failure determination value or comparing the difference between those outlet hydrogen pressures and a failure determination value. However, because the hydrogen flow rate changes all the time under the effect of operation load or flow rate characteristic of the regulator 61, regardless of whether the hydrogen discharge valve 62 is opened or closed, the failure determination value has to be set so that pressure fluctuations caused by those effects are not erroneously determined as pressure fluctuations caused by opening and closing of the hydrogen discharge valve 62. Furthermore, if the opening-closing failure of the hydrogen discharge valve 62 is once determined, the erroneous determination can be avoided by repeatedly implementing the failure determination the predetermined number of times.

Figure 3:
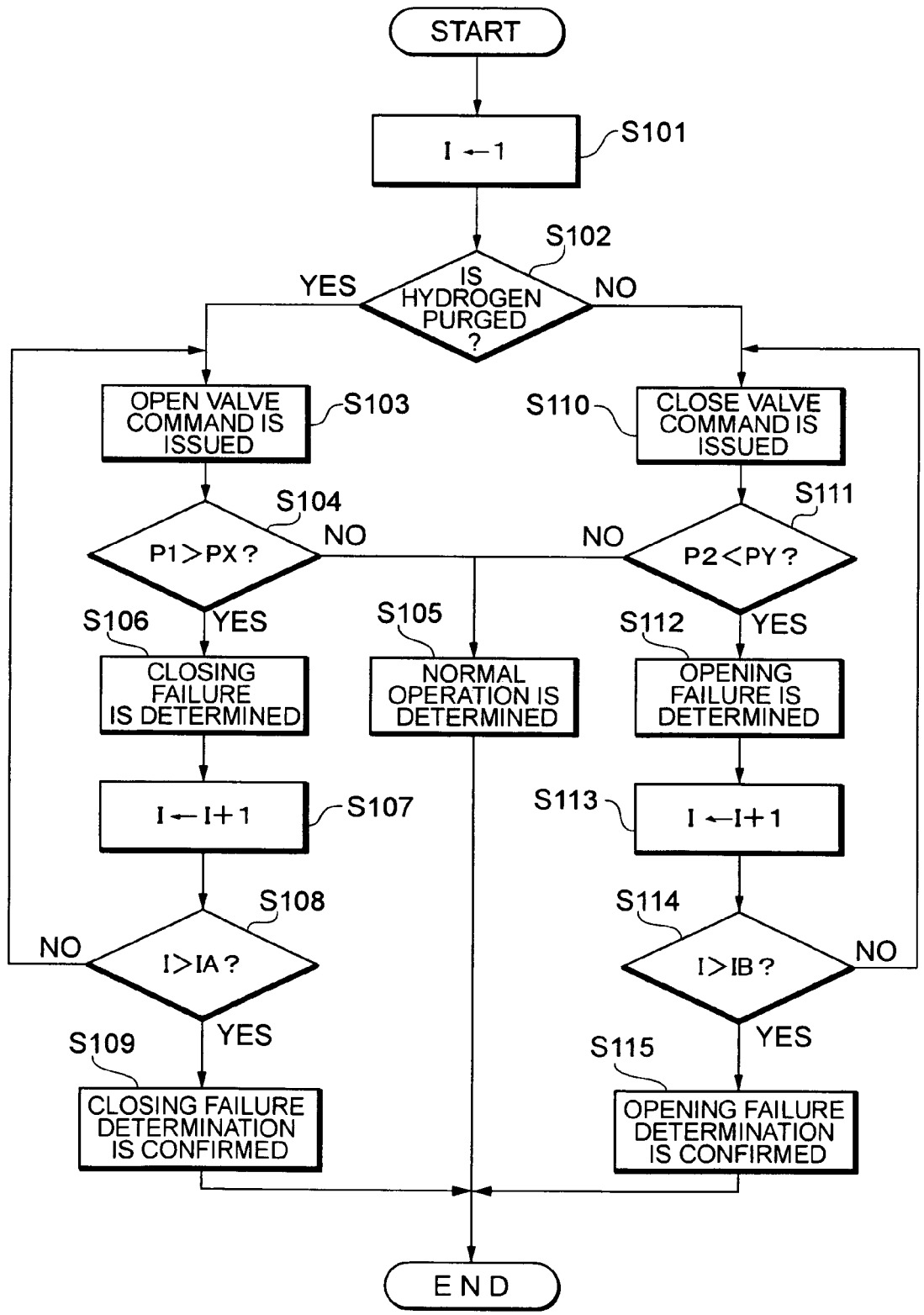
FIG. 3 illustrates a failure determination routine using an absolute value of the outlet hydrogen pressure.

FIG. 3 shows a hydrogen discharge valve failure determination routine using the absolute value of the outlet hydrogen pressure. This routine is executed by the control unit 50. When this routine is requested, first, an initial value "1" is introduced to initialize a variable I (S101). The variable I is a variable for counting the number of failure determination cycles. Then, whether or not hydrogen purging is performed is determined (S102). When hydrogen purging is performed (S102: YES), an open valve command is issued to the hydrogen discharge valve 62 (S103), and it is determined whether or not the minimum value P1 of the outlet hydrogen pressure (minimum value detected by the pressure sensor 70) is equal to or higher than a supposed maximum pressure PX during hydrogen purging (S104). When the minimum value P1 of the outlet hydrogen pressure is less than the supposed maximum pressure PX during hydrogen purging, (S104: NO), the valve is determined to be normally opened (S105) and the routine is ended. On the other hand, when the minimum value P1 of the outlet hydrogen pressure is equal to or higher than the supposed maximum pressure PX during hydrogen purging (S104: YES), the hydrogen discharge valve 62 is determined not to be normally opened, that is, a closing failure is determined (S106). The variable I is then incremented by "1" (S107), and if the value of variable I is less than a predetermined number IA (S108: NO), the processing of step S103 and subsequent steps is repeated again, but when the value of variable I is equal to or higher than the predetermined number IA (S108: YES) the hydrogen discharge valve 62 is confirmed to be in the closing failure state (S109).

On the other hand, when hydrogen purging is not performed (S102: NO), a close valve command is issued to the hydrogen discharge valve 62 (S110), and it is determined whether or not the outlet hydrogen pressure (hydrogen pressure detected by the pressure sensor 70) P2 is equal to or lower than the supposed minimum pressure PY during normal operation (S111). When the outlet hydrogen pressure P2 is equal to or higher than the supposed minimum pressure PY during normal operation (S111: NO), the valve is determined to be normally closed (S105) and the routine is ended. On the other hand, when the outlet hydrogen pressure P2 is equal to or less than the supposed minimum pressure PY during normal operation (S111: YES), the hydrogen discharge valve 62 is determined not to be normally closed, that is, an opening failure is determined (S112). The variable I is then incremented by "1" (S113), and if the value of variable I is less than a predetermined number IB (S114: NO), the processing of step S110 and subsequent steps is repeated again, but when the value of variable I is equal to or higher than the predetermined number IB (S114: YES) the hydrogen discharge valve 62 is confirmed to be in the closing failure state (S115).

The "opening failure" denotes a failure state in which the valve remains opened and cannot be closed, and the "closing failure" denotes a failure state in which the valve remains closed and cannot be opened.

Figure 4:
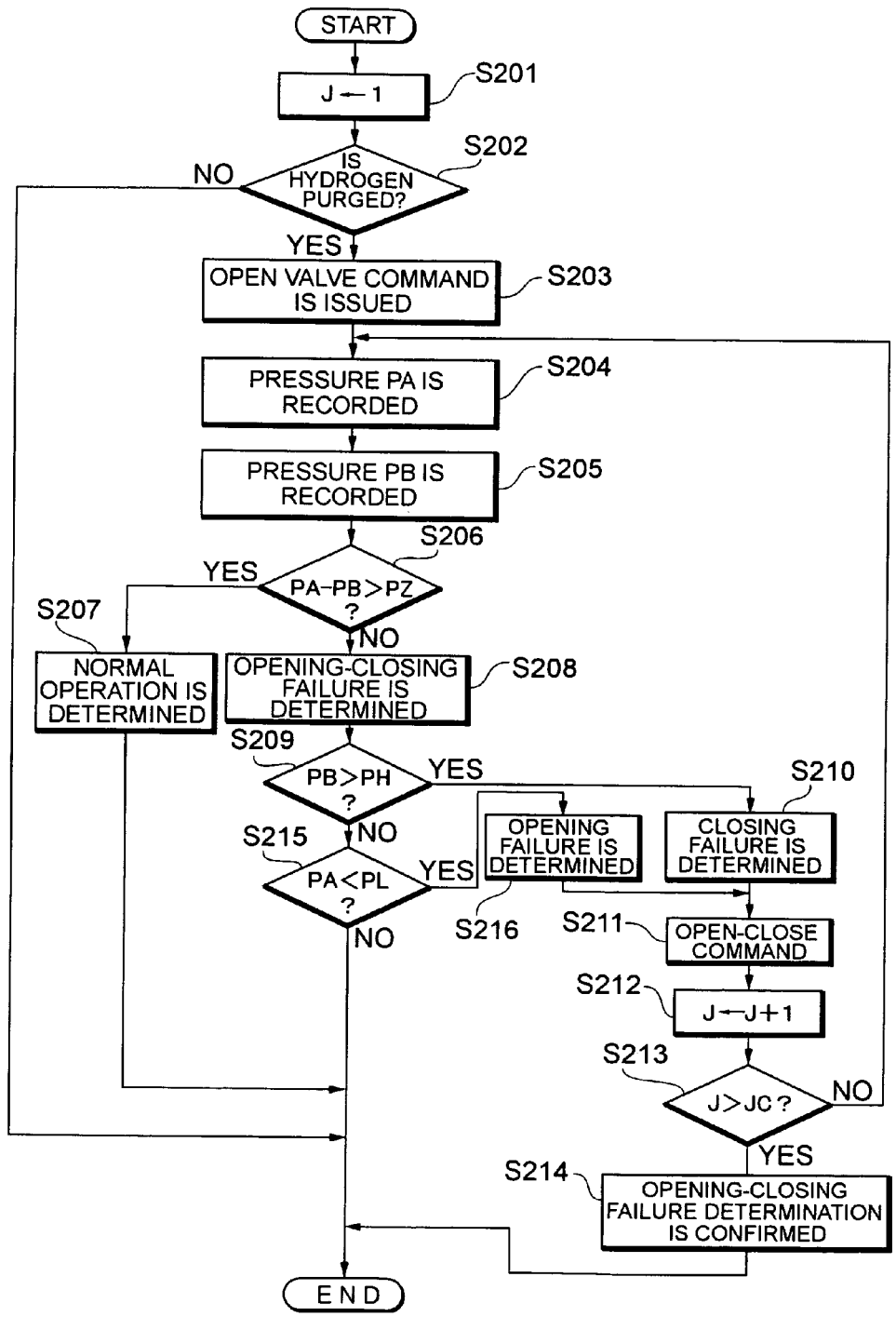
FIG. 4 is a failure determination routine using a pressure difference of the outlet hydrogen pressure.

FIG. 4 shows a hydrogen discharge valve failure determination routine using a differential pressure of the outlet hydrogen pressure. This routine is executed by the control unit 50. When this routine is requested, first, an initial value "1" is introduced to initialize a variable J (S201). The variable J is a variable for counting the number of failure determination cycles. Then, whether or not hydrogen purging is performed is determined (S202). When hydrogen purging is not performed (S202: NO), the routine is ended. When hydrogen purging is performed (S202: YES), an open valve command is issued to the hydrogen discharge valve 62 (S203), and the outlet hydrogen pressure PA immediately after the hydrogen purging (immediately before the valve open command has been issued) and the minimum pressure PB of the outlet hydrogen pressure after the hydrogen purging (after the predetermined interval elapses from the moment the valve open command has been issued) are recorded (S204, S205). When the hydrogen discharge valve 62 is opened normally, the outlet hydrogen pressure has to decrease. Therefore, the difference between the above-described pressure PA and pressure PB can be expected to become equal to or higher than a predetermined supposed pressure difference (failure determination value) PZ. The supposed pressure difference PZ is the difference in the outlet hydrogen pressure that is detected when the hydrogen discharge valve 62 is normally opened. In high-load operation when hydrogen with a high flow rate is required, the secondary pressure of the regulator 61 drops, but in a low-load operation in which hydrogen with low flow rate is sufficient, the secondary pressure of the regulator 61 increases. Therefore, the supposed pressure difference PZ during a low-load operation is higher than that during a high-load operation. Here, the pressure difference (PA−PB) is compared with the supposed pressure difference PZ, and if the pressure difference (PA−PB) is equal to or higher than the supposed pressure difference PZ (S206: YES), the valve is determined to be operating without the opening-closing failure (normal operation (S207) and the routine is ended.

On the other hand, if the pressure difference (PA−PB) is less than the supposed pressure difference PZ (S206: NO), the hydrogen discharge valve 62 is determined not to be normally opened and closed, that is, an opening-closing failure is determined (S208). The maximum pressure PH at which the outlet hydrogen pressure during hydrogen purging can assume the minimum value and the above-described pressure PB are then compared to determine whether the hydrogen discharge valve 62 is in the closing failure state or opening failure state (S209). When the pressure PB is equal to or higher than the pressure PH (S209: YES), the hydrogen discharge valve 62 is determined not to be normally opened, that is, a closing failure is determined (S210). In order to avoid the erroneous detection, an open-close command is again issued to the hydrogen discharge valve 62 (S211) and the value of variable J is incremented by "1" (S212). If the value of variable J is less than a predetermined number JC (S213: NO), the processing of step S204 and subsequent steps is repeated again, but when the value of variable J is equal to or higher than the predetermined number JC (S213: YES) the hydrogen discharge valve 62 is confirmed to be in the closing failure state (S214).

On the other hand, when the pressure PB is less than the pressure PH (S209: NO), the hydrogen discharge valve 62 can be assumed to be capable of being normally opened. Accordingly, a supposed minimum pressure PL during hydrogen purging and the above-described pressure PA are compared to determine whether or not the hydrogen discharge valve 62 is in the opening failure state (S215), and when the pressure PA is equal to or less than the pressure PL (S215: YES), the hydrogen discharge valve 62 is determined not to be normally closed, that is, an opening failure is determined (S216). The processing of the above-described step S211 and subsequent steps is then performed. By contrast, when the pressure PA is equal to or higher than the pressure PL (S215: NO), the failure determination of step S208 is considered to be an error. Therefore, a decision is made that no opening-closing failure has occurred in the hydrogen discharge valve 62 and the routine is ended.

Figure 2:
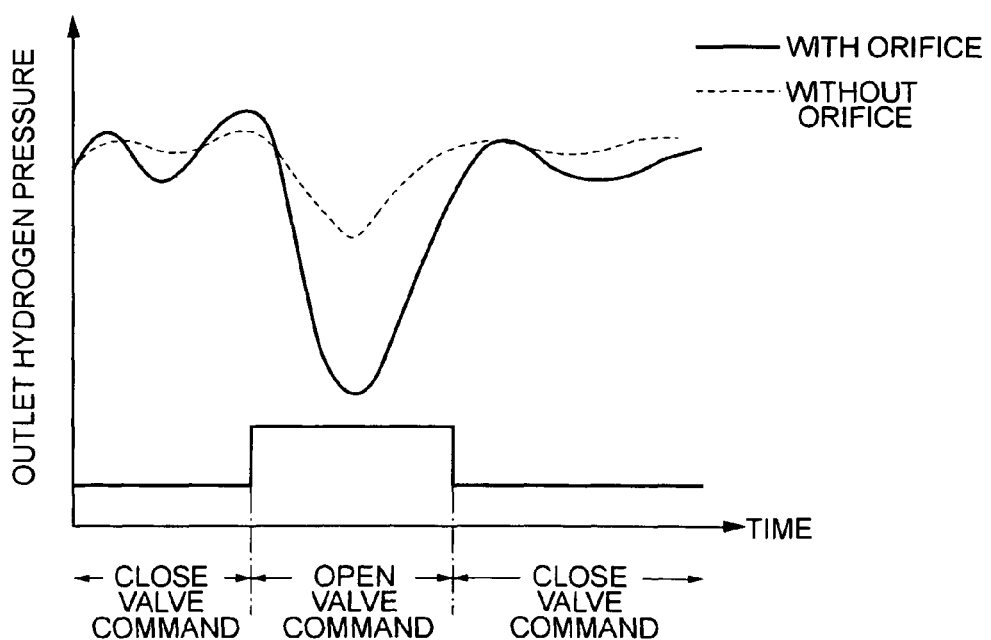
FIG. 2 illustrates the decrease in the outlet hydrogen pressure when the hydrogen discharge valve is opened.

The above-described hydrogen discharge valve failure determination routine uses the outlet hydrogen pressure that fluctuates in response to the operation load. Therefore, a configuration is preferred in which an orifice (throttle means or flow rate limiting means) 80 for reducing a flow channel cross-section area be provided (see FIG. 1) in the hydrogen discharge channel 32 between the hydrogen discharge port 27 and pressure sensor 70 and the decrease quantity of the outlet hydrogen pressure after the hydrogen discharge valve 62 has been opened is further increased to raise the failure determination accuracy. When the orifice 80 is provided upstream of the pressure sensor 70, the low resistance of the hydrogen discharge channel 32 increases. Therefore, even if the hydrogen discharge valve 62 is opened, the hydrogen gas can hardly flow to the pressure sensor 70 located downstream of the orifice 80. For this reason, as shown in FIG. 2, the decrease quantity of the outlet hydrogen pressure (shown by a solid line) in the case the orifice 80 provided becomes larger than the decrease quantity of the outlet hydrogen pressure (shown by a dot line) in the case where the orifice 80 is not provided. By so increasing the decrease quantity of the outlet hydrogen pressure after the hydrogen discharge valve 62 has been opened, the erroneous determination of the opening-closing failure caused by the operation load or flow rate characteristic of the regulator 61 can be avoided.

However, the appropriate correction taking into account the decrease quantity of the outlet hydrogen pressure associated with the installation of the orifice 80 has to be conducted with respect to the "supposed maximum pressure during hydrogen purging", "supposed minimum pressure during normal operation", "supposed pressure difference", "maximum pressure at which a minimum value of the outlet hydrogen pressure during hydrogen purging can be attained", and "supposed minimum pressure during hydrogen purging" that are used as the failure determination values.

In the present embodiment, failure determination of the hydrogen discharge valve 32 is performed by comparing the outlet hydrogen pressure with a failure determination value taking into account the fluctuation of hydrogen flow rate caused by the operation load and flow rate characteristic of the regulator 61. Therefore, the failure determination can be performed without being affected by the operating state of the system. Furthermore, by disposing the orifice 80 upstream of the pressure sensor 70, the decrease quantity of the outlet hydrogen pressure after the hydrogen discharge valve 62 has been opened can be increased and the erroneous determination of the opening-closing failure caused by the operation load or flow rate characteristic of the regulator 61 can be avoided.

Either the hydrogen discharge valve failure determination routine using the absolute pressure value of the outlet hydrogen pressure or the hydrogen discharge valve failure determination routine using the pressure difference of the outlet hydrogen pressure may be performed, but a configuration may be also used in which, when the opening-closing failure is detected by one failure determination routine, the second failure determination routine is implemented to determine again whether the opening-closing failure has occurred.

Embodiment 2

Figure 5:
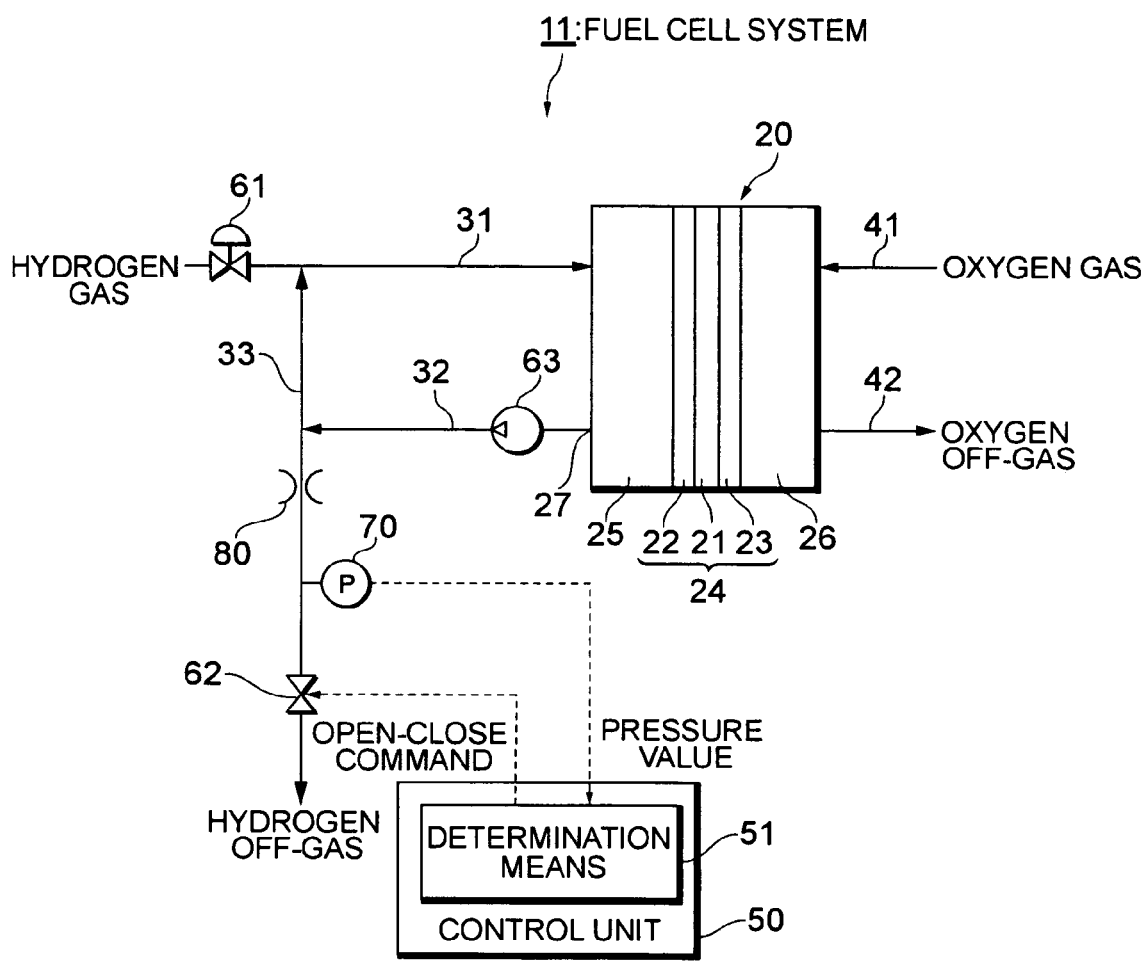
FIG. 5 is a structural diagram of main components of the fuel cell system of Embodiment 2.

FIG. 5 illustrates a schematic configuration of a fuel cell system 11 of the present embodiment. In the figure, the components identical to those shown in FIG. 1 are denoted by identical reference numerals and the detailed explanation thereof is omitted. The system 11 comprises a hydrogen circulation system, and a hydrogen circulation channel 33 is provided for refluxing the hydrogen gas flowing through the hydrogen discharge channel 32 into the hydrogen supply channel 31. A hydrogen circulation pump 63 for pumping the hydrogen gas discharged from the fuel cell stack 20 into the hydrogen supply channel 31 is disposed in the hydrogen discharge channel 32. The hydrogen circulation pump 63 is drive controlled by a control unit 50. In the system comprising the hydrogen circulation pump 63 in the hydrogen circulation system, as in the present embodiment, pressure fluctuations (pulsations) of hydrogen gas associated with the operation of the hydrogen circulation pump 63 occur in addition to the flow rate characteristic of the regulator 61. Therefore, there is a risk of a measurement error appearing in the outlet hydrogen pressure (detected pressure) that is detected by the pressure sensor 70 under the influence of the hydrogen circulation pump 63. Accordingly, an orifice 80 is provided between the downstream side of the hydrogen circulation pump 63 and the pressure sensor 70 to suppress pressure fluctuations of the hydrogen gas propagating to the pressure sensor 70 as the hydrogen circulation pump 63 is driven. The failure determination processing of the hydrogen discharge valve 62 in the present embodiment (a hydrogen discharge valve failure determination routine using the absolute or differential value of the outlet hydrogen pressure) is identical to that of Embodiment 1.

Embodiment 3

The orifice 80 is not the only means suitable for increasing the outlet hydrogen pressure when the hydrogen discharge valve 62 is opened in the above-described Embodiment 1 and Embodiment 2, and any throttle means can be used that can reduce the channel cross-section area of the hydrogen discharge channel 32. For example, a configuration may be used in which a valve serving as a throttle means is installed in the hydrogen discharge channel 32 and the channel cross-section area of the hydrogen discharge channel 32 is decreased by adjusting the opening degree of the valve. Furthermore, such throttle means (orifice or valve) is not a mandatory component and may be appropriately omitted.

Embodiment 4

Figure 6:
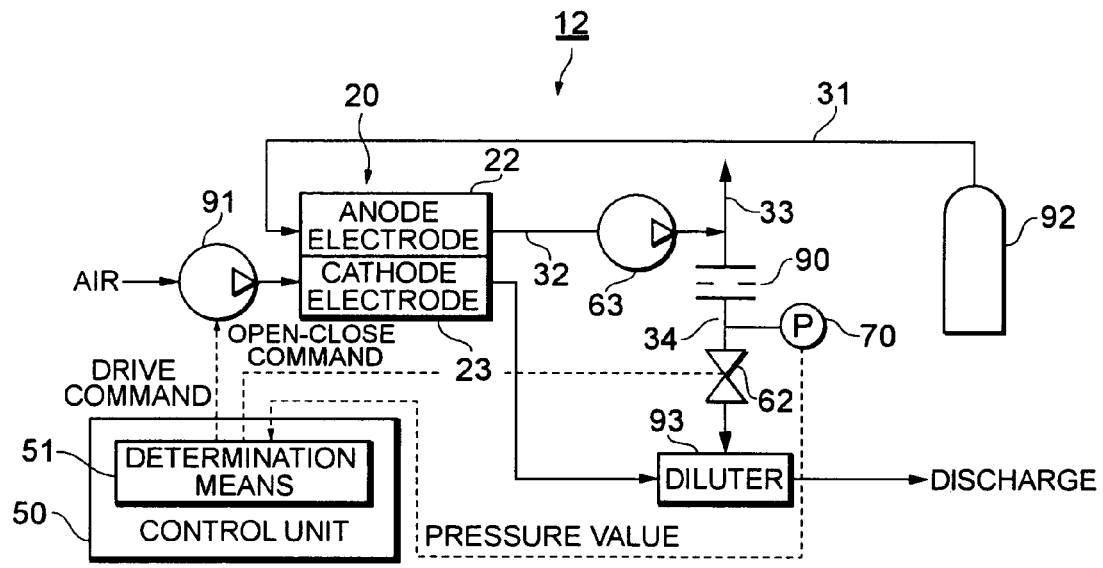
FIG. 6 is a structural diagram of main components of the fuel cell system of Embodiment 3.

FIG. 6 illustrates a schematic configuration of a fuel cell system 12 of the present embodiment. In the figure, the components identical to those shown in FIG. 5 are denoted by identical reference numerals and the detailed explanation thereof is omitted. The hydrogen gas released from a high-pressure hydrogen tank 92 is supplied to an anode electrode 22 of a fuel cell 20 via a hydrogen supply channel 31. The hydrogen off-gas produced by the cell reaction is caused to flow into a hydrogen discharge channel 32, compressed by a hydrogen circulation pump 63, and refluxed via a hydrogen circulation channel 33 into the hydrogen supply channel 31. The hydrogen discharge channel 34 is branched in the hydrogen circulation channel 33, and the hydrogen off-gas with a high concentration of impurities is discharged to the outside of the hydrogen circulation system by opening and closing the hydrogen discharge valve 62. The hydrogen off-gas discharged from the hydrogen discharge valve 62 is introduced into a diluter 93, diluted to a sufficiently low concentration and discharged from the system. On the other hand, the air taken in from the atmosphere is pressurized by an air compressor 91 and supplied to a cathode electrode 23 via an oxygen supply channel 41. The oxygen off-gas produced by the cell reaction flows through an oxygen discharge channel 42 into the diluter 93. A flow rate restricting element 90 is installed upstream of the hydrogen discharge valve 62. The flow rate restricting element 90 is a member, for example, an orifice, for restricting the flow rate of hydrogen off-gas flowing through the hydrogen discharge channel 34. The control unit 50 performs drive control of the air compressor 91 and open-close control of the hydrogen discharge valve 62 and also performs failure determination of the hydrogen discharge valve 62 based on the pressure value detected by the pressure sensor 70. The pressure sensor 70 measures the hydrogen pressure inside the hydrogen discharge channel 34 located between the outlet side of the flow rate restricting element 90 and inlet of the hydrogen discharge valve 62.

Figure 7:
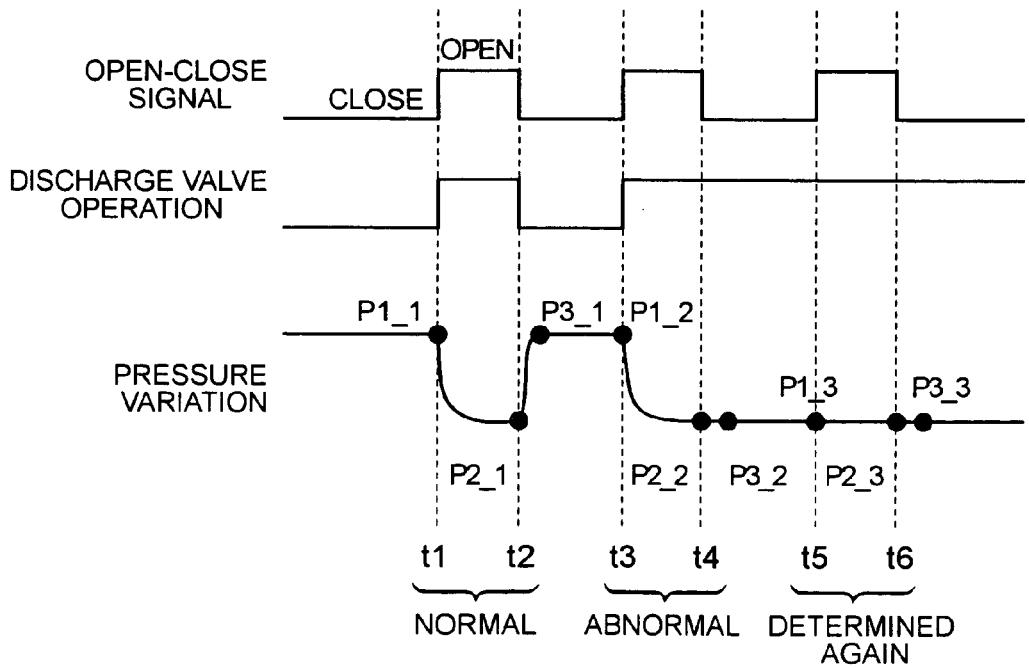
FIG. 7 is an explanatory drawing illustrating pressure variations during open-close operation of the hydrogen discharge valve.

FIG. 7 is an explanatory drawing illustrating the variation of pressure following the operations of opening and closing the hydrogen discharge valve 62. In the example shown in the figure, drive signals for repeating three times the opening-closing operation of the hydrogen discharge valve 62 is outputted. The first valve open command is outputted within t1-t2 interval, the second valve open command is outputted within a t3-t4 interval, and the third valve open command is outputted within a t5-t6 interval. Though the hydrogen discharge valve 62 is normally opened by the first valve open command, normal opening-closing operations are not performed by the hydrogen discharge valve 62 in response to the second and third valve open command and the valve remains open (opening failure). In the figure, $P1\_n$ stands for a pressure value obtained immediately after the n-th valve open command has been issued to the hydrogen discharge valve 62, $P2\_n$ stands for a minimum pressure value obtained after the n-th valve open command has been issued to the hydrogen discharge valve 62 and before the valve close command is issued, and $P3\_n$ stands for a return pressure value obtained immediately after the n-th valve close command has been issued to the hydrogen discharge valve 62. Those pressure values $P1\_n$, $P2\_n$, $P3\_n$ are the detection values of the pressure sensor 70. When no valve failure has occurred in the hydrogen discharge valve 62, the pressure $P1\_n$ attained when the hydrogen discharge valve 62 is closed is equal to the pressure of the hydrogen circulation channel 33. If the hydrogen discharge valve 62 is opened, the flow of the hydrogen gas flowing down the hydrogen discharge channel 34 is inhibited by the flow rate restricting element 90 and the minimum pressure value $P2\_n$ becomes sufficiently lower than the minimum pressure value attained without the flow rate restricting element 90, thereby making it possible to increase the variation of pressure accompanying the opening-closing operations of the hydrogen discharge valve 62.

A method for diagnosing an opening-closing failure of the hydrogen discharge valve 62 will be described below.

(1) The control unit 50 stores the pressure values $P1\_1$, $P2\_1$, $P3\_1$ at the time in which a first valve open command has been issued to the hydrogen discharge valve 62.

(2) The control unit 50 compares $P3\_1$ and $P2\_1$ and determines as to whether the difference in pressure between the two is equal to or higher than a predetermined threshold. In the example shown in FIG. 7, the hydrogen discharge valve 62 is normally opened and closed in response to the first valve open command. Therefore, the difference in pressure between the two is equal to or higher than the threshold. Accordingly, the control unit 50 judges that the hydrogen discharge valve 62 is normally opened and closed and stores $P1\_1$ as a normal pressure.

(3) The control unit 50 stores the pressure values $P1\_2$, $P2\_2$, $P3\_2$ at the time in which a second valve open command has been issued to the hydrogen discharge valve 62.

(4) The control 50 compares $P3\_2$ and $P2\_2$ and determines as to whether the difference in pressure between the two is equal to or higher than a predetermined threshold. In the example shown in FIG. 7, the hydrogen discharge valve 62 is not normally opened and closed in response to the second valve open command. Therefore, the difference in pressure between the two is less than the threshold. Accordingly, the control unit 50 judges that the hydrogen discharge valve 62 is in an opening failure state.

(5) If the hydrogen discharge valve 62 is in an opening failure state, there is a risk of a large amount of the off-gas flowing into the diluter 93 and being discharged outside the system, without being sufficiently diluted. Accordingly, the control unit 50 instructs the air compressor 91 to increase the air flow rate.

(6) To repeat the determination, the control unit 50 further issues a third valve open command to the hydrogen discharge valve 62.

(7) The control unit 50 stores the pressure values $P1\_3$, $P2\_3$, $P3\_3$ at the time in which the third valve open command has been issued to the hydrogen discharge valve 62.

(8) The control 50 compares P1_1 (pressure during normal operation) and P1_3 and determines as to whether the difference in pressure between the two is less than a predetermined threshold. In the example shown in FIG. 7, the hydrogen discharge valve 62 is not normally opened and closed in response to the third valve open command. Therefore, the difference in pressure between the two is equal to or higher than the threshold. Accordingly, the control unit 50 determines that the state with an opening failure of the hydrogen discharge valve 62 is maintained.

(9) Once the opening failure state of the hydrogen discharge valve 62 has been determined to be maintained, the control unit 50 compares P3_3 and P2_3 and, as the final configuration, determines as to whether the difference in pressure between the two is equal to or higher than a predetermined threshold. In the example shown in FIG. 7, the hydrogen discharge valve 62 is not normally opened and closed in response to the third valve open command. Therefore, the difference in pressure between the two is less than the threshold. Accordingly, the control unit 50 determines that the state with an opening failure of the hydrogen discharge valve 62 is maintained.

Figure 8:
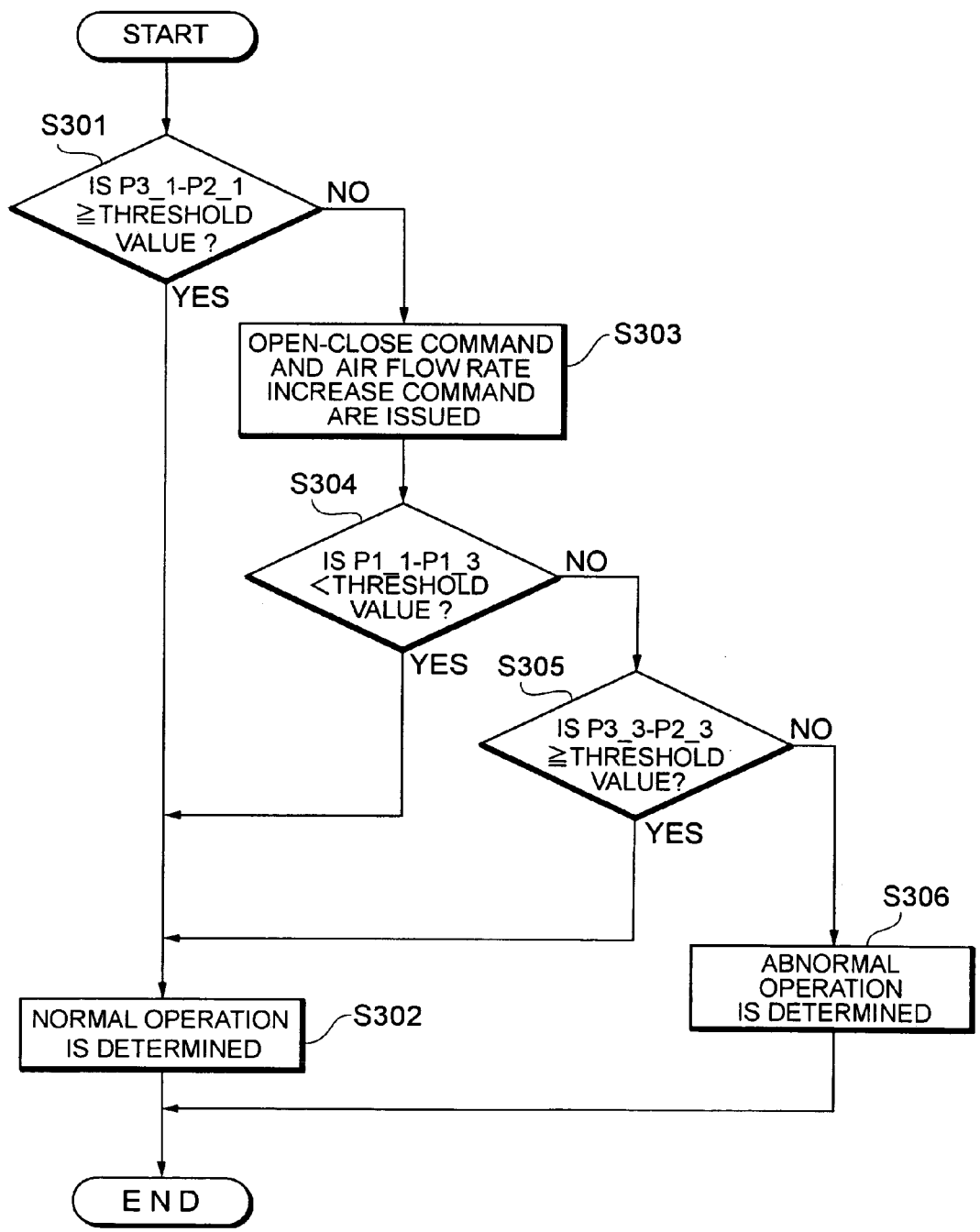
FIG. 8 is a failure determination routine of a hydrogen discharge valve.

FIG. 8 shows a failure determination routine of the hydrogen discharge valve 62. The explanation presented above will be repeated by referring to this figure. When this routine is requested, the control unit 50 determines as to whether the difference in pressure between P3_1 and P2_1 is equal to or higher than a predetermined threshold (S301). When the difference in pressure between P3_1 and P2_1 is equal to or higher than a predetermined threshold (S301: YES), the control unit 50 determines that the hydrogen discharge valve 62 is normally opened and closed (S302) and ends the routine. On the other hand, when the difference in pressure between P3_1 and P2_1 is below the predetermined threshold (S301: NO), there is a possibility of the opening failure of the hydrogen discharge valve 62. Therefore, the control unit 50 again issues a valve open command to the hydrogen discharge valve 62 and instructs the air compressor 91 to increase the air flow rate (S303). The control unit 50 then determines as to whether the difference in pressure between P1_1 and P1_3 is less than a predetermined threshold (S304). When the difference in pressure between P1_1 and P1_3 is less than the predetermined threshold (S304: YES), the control unit 50 determines that the hydrogen discharge valve 62 is normally opened and closed (S302) and ends the routine. On the other hand, when the difference in pressure between P1_1 and P1_3 is equal to or higher than the predetermined threshold (S304: NO), there is a possibility of the opening failure of the hydrogen discharge valve 62. Therefore, to confirm the results again, the control unit 50 determines as to whether the difference in pressure between P3_3 and P2_3 is equal to or higher than a predetermined threshold (S305). When the difference in pressure between P3_3 and P2_3 is equal to or higher than a predetermined threshold (S305: YES), the control unit 50 determines that the hydrogen discharge valve 62 is normally opened and closed (S302) and ends the routine. On the other hand, when the difference in pressure between P3_3 and P2_3 is below the predetermined threshold (S305: NO), the control unit 50 determines that there is an opening failure of the hydrogen discharge valve 62 (S306) and ends the routine.

With the present embodiment, because a pressure sensor 70 is installed in the hydrogen discharge channel 34 between the outlet side of the flow rate restricting element 90 and the inlet side of the hydrogen discharge valve 62, the variation of pressure accompanying the operations of opening and closing the hydrogen discharge valve 62 can be increased. Furthermore, the failure of the hydrogen discharge valve 62 can be determined more accurately by comparing a plurality of pressure values (P1_n, P1_n, P3_n) and the discharge of high-concentration hydrogen gas can be inhibited by increasing the air flow rate of the air compressor 91 in advance by way of precaution against an opening failure of the hydrogen discharge valve 62.

Embodiment 5

A method for determining the location of the flow rate decrease cause generated in the hydrogen discharge system will be described below. The fuel cell system employed in the present embodiment may have a configuration in which a pressure sensor 70 is installed upstream of the hydrogen discharge valve 62. For example, in a more preferred configuration, the pressure sensor 70 is installed between the hydrogen discharge valve 62 and the flow rate restricting element 90 disposed upstream of the hydrogen discharge valve, as in Embodiment 4. For the sake of convenience, the explanation will be conducted below with reference to the fuel cell system 12 of Embodiment 4.

Figure 9:
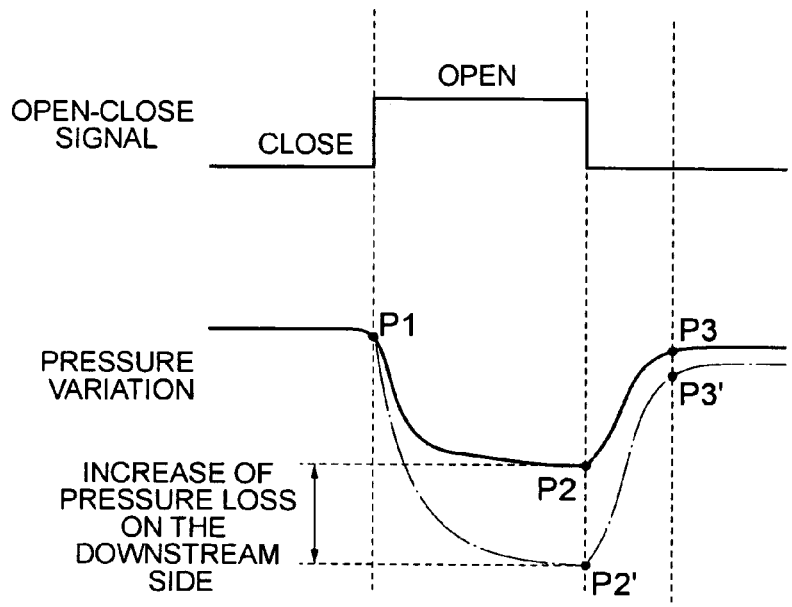
FIG. 9 is an explanatory drawing illustrating pressure variations during open-close operation of the hydrogen discharge valve.
Figure 10:
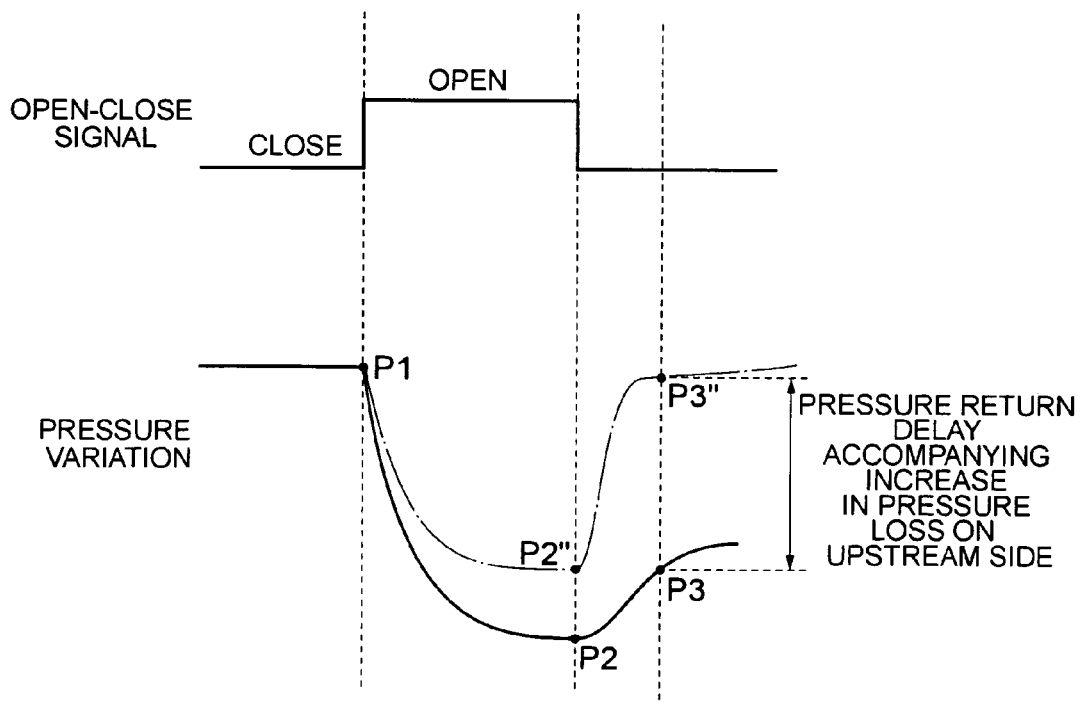
FIG. 10 is an explanatory drawing illustrating pressure variations during open-close operation of the hydrogen discharge valve.

FIG. 9 and FIG. 10 show pressure variations accompanying the opening-closing operation of the hydrogen discharge valve 62. In the figure, P1 stands for a pressure value obtained immediately after the open command has been issued to the hydrogen discharge valve 62, P2 stands for a minimum pressure value obtained after a valve open command has been issued to the hydrogen discharge valve 62 and before the valve close command is issued, and P3 stands for a pressure value (return pressure value) obtained after a predetermined time has elapsed since the hydrogen discharge valve 62 has been closed. Those pressure values P1, P2, P3 are the detection values of the pressure sensor 70.

A solid line in FIG. 9 indicates the variation of pressure when the flow rate decrease cause (for example, clogging) appears downstream of the hydrogen discharge valve 62 or in the hydrogen discharge valve 62 itself, and a dash-dot line indicates the variation of pressure in the normal state. If the flow rate decrease cause appears downstream of the hydrogen discharge valve 62 or in the hydrogen discharge valve 62 itself, the pressure loss downstream of the hydrogen discharge valve 62 or in the hydrogen discharge valve 62 itself increases. Therefore, the pressure value P2 detected by the pressure value 70 when the hydrogen discharge valve 62 is opened becomes higher than the normal value P2'. On the other hand, because the flow rate decrease cause is absent upstream of the hydrogen discharge valve 62, the variation of pressure when the hydrogen discharge valve 62 is closed is almost identical to the variation in pressure during normal operation, and the return pressure P3 is almost identical to the normal value P3'.

The solid line in FIG. 10 indicates the variation of pressure when the flow rate decrease cause (for example, the flow rate restricting element 90) appears upstream of the hydrogen discharge valve 62 or in the hydrogen discharge valve 62 itself, and a dash-dot line indicates the variation of pressure in the normal state. If the flow rate decrease cause appears upstream of the hydrogen discharge valve 62, the amount of hydrogen gas passing through the flow rate restricting element 90 decreases. Therefore, the pressure value P2 detected by the pressure sensor 70 when the hydrogen discharge valve 62 is opened becomes less than the normal value P2". Furthermore, following the increase in the pressure loss upstream of the hydrogen discharge valve 62, the pressure is not immediately restored, even if the hydrogen discharge valve 62 is closed, and the return pressure P3 becomes lower than the normal value P3".

Thus, the patterns of pressure variation differ significantly between the case where the flow rate decrease cause appears downstream of the hydrogen discharge valve 62 or in the hydrogen discharge valve 62 itself and the case where the flow rate decrease cause appears upstream of the hydrogen discharge valve. When the flow rate decrease cause appears downstream of the hydrogen discharge valve 62 or in the hydrogen discharge valve 62 itself, the pressure decrease quantity (P1−P2) at the time the hydrogen discharge valve 62 is opened decreases, but the pressure return quantity (P3−P2) at the time the hydrogen discharge valve 62 is closed again is a normal value. On the other hand, when the flow rate decrease cause appears upstream of the hydrogen discharge valve 62, the pressure decrease quantity (P1−P2) at the time the hydrogen discharge valve 62 is opened increases, but the pressure return quantity (P3−P2) at the time the hydrogen discharge valve 62 is closed again decreases.

Figure 11:
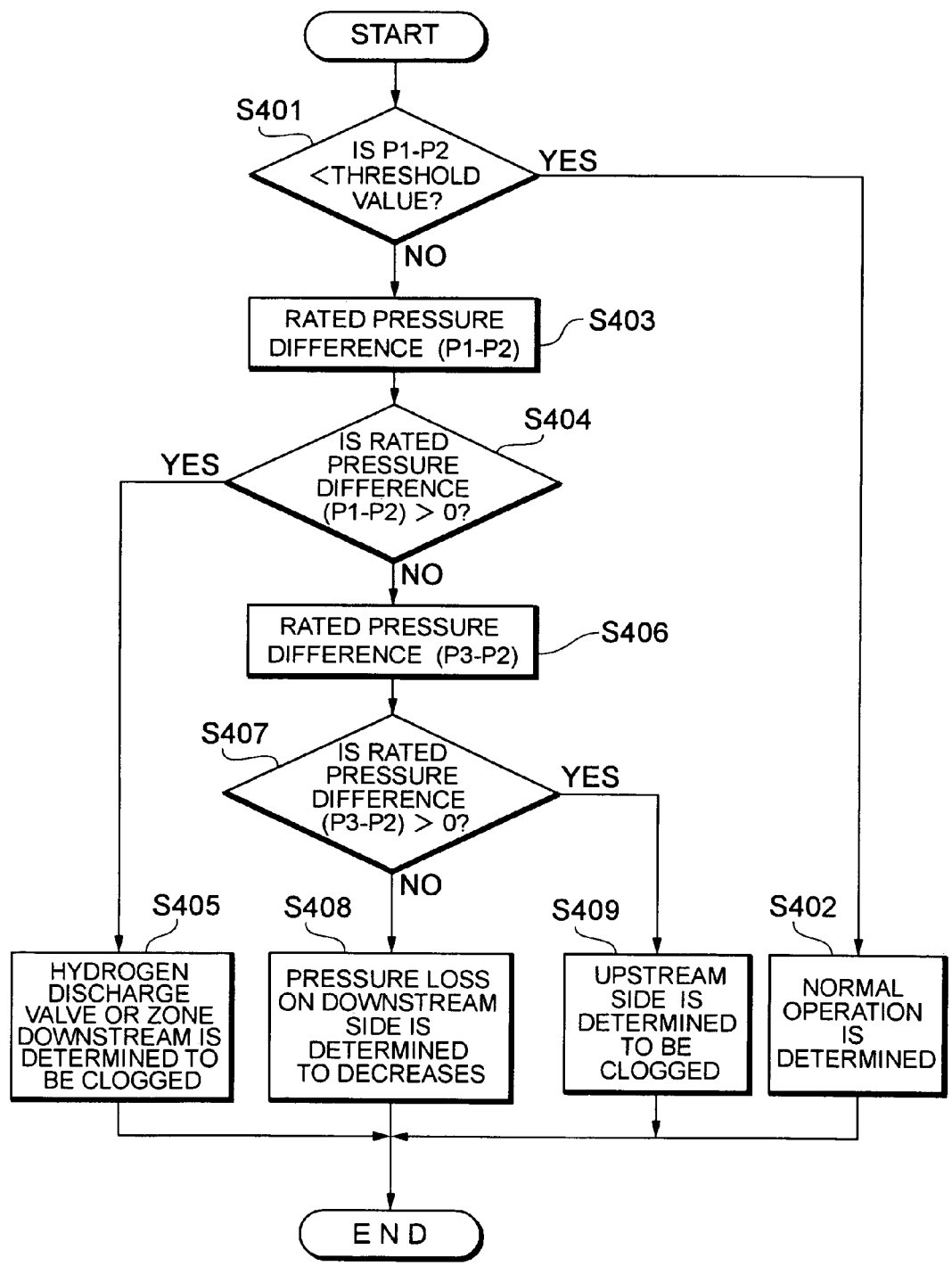
FIG. 11 is a determination routine for specifying the abnormality location in the hydrogen discharge system.

FIG. 11 shows an abnormality region determination routine of the hydrogen discharge system.

A control unit 60 issues an opening-closing command to the hydrogen discharge valve 62 and stores the pressure values P1, P2, P3 detected by the pressure sensor 70.

If the pressure difference (P1−P2) is equal to or less than a predetermined threshold (S401: YES), the control unit 60 determines that the operation is normal (S402).

On the other hand, if the pressure difference (P1−P2) exceeds the predetermined threshold (S401: NO), the control unit 60 computes the rated pressure difference—(P1−P2) (S403). If the rated pressure difference—(P1−P2) is >0 (S404: YES), the control unit 60 determines that the flow rate decrease cause has appeared downstream of the hydrogen discharge valve 62 or in the hydrogen discharge valve 62 itself (S405).

If the rated pressure difference—(P1−P2) is ≤0 (S404: NO), the control unit 60 computes the rated pressure difference—(P3−P2) (S406). If the rated pressure difference—(P3−P2) is >0 (S407: YES), the control unit 60 determines that the flow rate decrease cause has appeared upstream of the hydrogen discharge valve 62 (S409).

If the rated pressure difference—(P3−P2) is ≤0 (S407: NO), the control unit 60 determines that the pressure low downstream of the hydrogen discharge valve 62 has decreased (S408).

With the present embodiment, the region (abnormality region) where flow rate decrease cause has appeared in the hydrogen discharge system can be specified by detecting pressure values P1, P2, P3.

With the present invention, failure determination of a discharge valve is performed based on failure determination values corresponding to the operating state of the fuel cell. Therefore, the failure determination can be accurately conducted, without being affected by the operating state of the fuel cell.

What is claimed is:

1. A fuel cell system comprising:
   a fuel cell having an anode electrode and a cathode electrode;
   a discharge valve installed in a discharge flow channel of an anode discharge gas that is discharged from the fuel cell; and
   a failure diagnostic device for diagnosing a failure of the discharge valve, the failure diagnostic device comprising:
   a non-adjustable throttle means for decreasing a flow channel section area of the discharge flow channel between a discharge port for the anode discharge gas of the fuel cell and the discharge valve, the throttle means being an orifice that is configured to decrease a flow channel section area of the discharge flow channel between the discharge port for the anode discharge gas and the discharge valve;
   an air compressor configured to supply air to the cathode electrode of the fuel cell;
   a detection means for detecting an anode discharge gas pressure between the throttle means and the discharge valve;
   a determination means for determining a failure of the discharge valve based on the anode discharge gas pressure detected by the detection means; and
   a control unit configured to execute the determination means including calculating a plurality of pressure values, and to increase an air flow rate of the air compressor during execution of the determination means such that a differential in pressure upstream of the orifice and pressure downstream of the orifice is increased and at least one of the calculated pressure values is determined when the air flow rate of the air compressor is increased.

2. The failure diagnostic device according to claim 1, wherein the determination means determines a failure of the discharge value based on the anode discharge gas pressure detected by the detection means and a failure determination value corresponding to a operating state of the fuel cell.

3. The failure diagnostic device according to claim 1, wherein the determination means repeats multiple times the failure determination of the discharge valve when a failure of the discharge valve is detected.

4. The failure diagnostic device according to claim 1, wherein the determination means determines a failure of the discharge valve based on a pressure fluctuations occurring when the discharge value is opened and closed.

5. The failure diagnostic device according to claim 4, wherein the determination means determines a failure of the discharge valve based on a pressure of the anode discharge gas detected by the detection means when the closed discharge valve is opened, a lowest pressure of the anode discharge gas detected by the detection means after the discharge valve has been opened and before it is closed, and a return pressure of the anode discharge gas detected by the detection means when the opened discharge valve is closed.

6. The failure diagnostic device according to claim 1, wherein the determination means determines that a flow rate decrease cause is located downstream of the discharge valve or in the discharge valve itself when a decrease quantity of a pressure value of the anode discharge gas detected by the detection means, when the closed discharge valve is opened, is less than a predetermined threshold value.

7. The failure diagnostic device according to claim 1, wherein the determination means determines that a flow rate decrease cause is located upstream of the discharge valve when a decrease quantity of a pressure value of the anode discharge gas detected by the detection means, when the closed discharge valve is opened, is equal to or higher than a predetermined threshold value.

8. A fuel cell system comprising:
   a fuel cell having an anode electrode and a cathode electrode;
   a discharge valve installed in a discharge flow channel of an anode discharge gas that is discharged from the fuel cell; and
   a failure diagnostic device configured to diagnose a failure of the discharge valve, the failure diagnostic device comprising:

an orifice configured to decrease a flow channel section area of the discharge flow channel between the discharge port for the anode discharge gas and the discharge valve;

an air compressor configured to supply air to the cathode electrode of the fuel cell;

a pressure sensor disposed downstream of the orifice and configured to detect an anode discharge gas pressure between the orifice and the discharge valve; and a control unit configured to determine an open-close failure of the discharge valve or damage to the discharge valve based on the anode discharge gas pressure detected by the pressure sensor including calculating a plurality of pressure values, the control unit being configured to increase an air flow rate of the air compressor such that a differential in pressure upstream of the orifice and pressure downstream of the orifice is increased during the failure or damage determination and at least one of the calculated pressure values is determined when the air flow rate of the air compressor is increased.

9. The failure diagnostic device according to claim 8, wherein the control unit determines a failure of the discharge value based on the anode discharge gas pressure detected by the pressure sensor and a failure determination value corresponding to an operating state of the fuel cell.

10. The failure diagnostic device according to claim 8, wherein the control unit executes multiple failure determinations of the discharge valve when an initial failure of the discharge valve is detected.

11. The failure diagnostic device according to claim 8, wherein the control unit determines a failure of the discharge valve based on a pressure fluctuations occurring when the discharge value is opened and closed.

12. The failure diagnostic device according to claim 11, wherein the control unit determines a failure of the discharge valve based on a pressure of the anode discharge gas detected by the pressure sensor when the closed discharge valve is opened, a lowest pressure of the anode discharge gas detected by the pressure sensor after the discharge valve has been opened and before it is closed, and a return pressure of the anode discharge gas detected by the pressure sensor when the opened discharge valve is closed.

13. The failure diagnostic device according to claim 8, wherein the control unit determines that a flow rate decrease cause is located downstream of the discharge valve or in the discharge valve itself when a decrease quantity of a pressure value of the anode discharge gas detected by the pressure sensor, when the closed discharge valve is opened, is less than a predetermined threshold value.

14. The failure diagnostic device according to claim 8, wherein the control unit determines that a flow rate decrease cause is located upstream of the discharge valve when a decrease quantity of a pressure value of the anode discharge gas detected by the pressure sensor, when the closed discharge valve is opened, is equal to or higher than a predetermined threshold value.

* * * * *